Patented Nov. 11, 1947

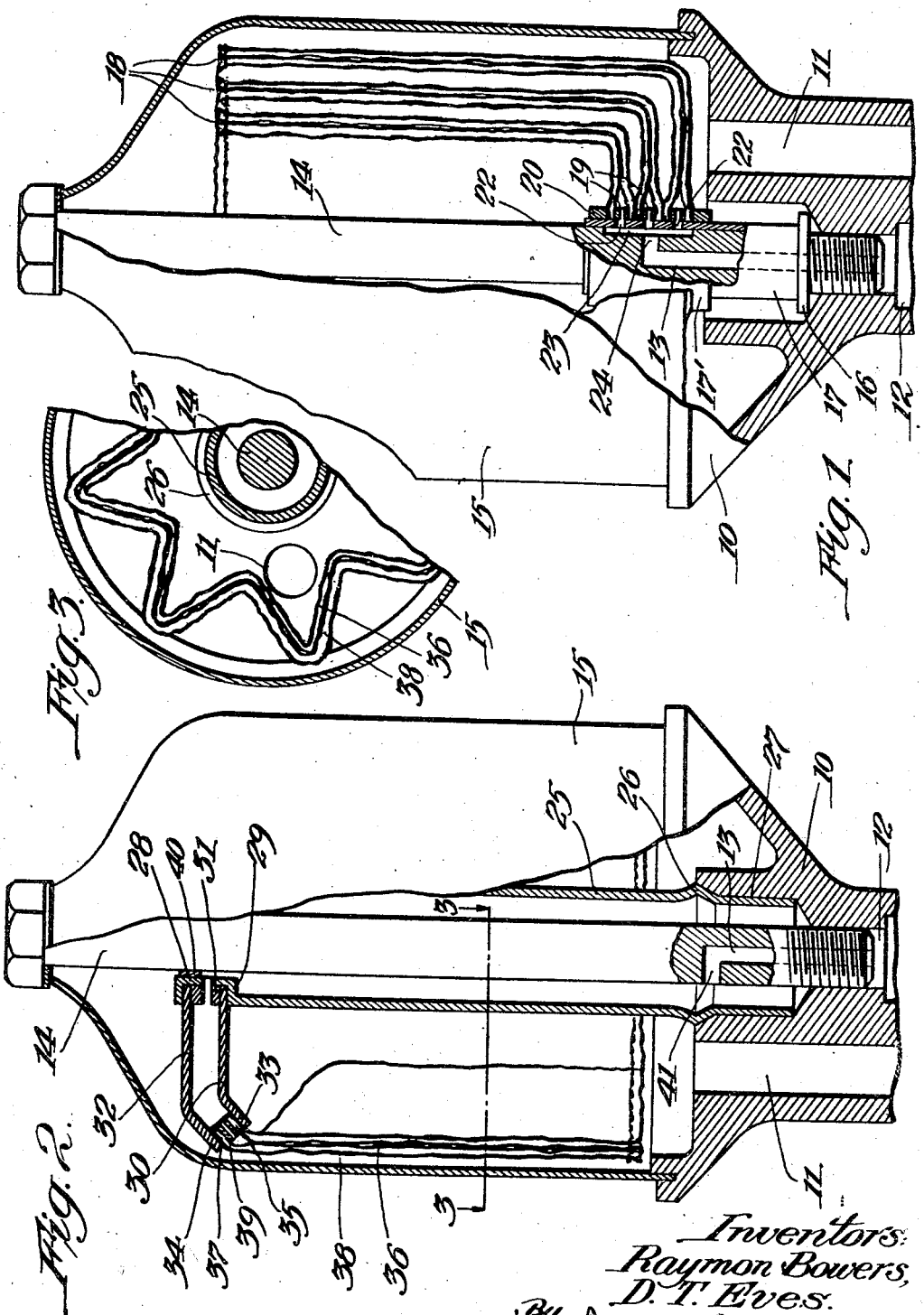

2,430,713

UNITED STATES PATENT OFFICE 2,430,713

OIL FILTER

Donald T. Eves, Minneapolis, Minn., and Raymon Bowers, Western Springs, Ill., assignors to International Harvester Company, a corporation of New Jersey Continuation of application Serial No. 449,106, June 30, 1942. This application May 8, 1944, Serial No. 534,568

3 Claims. (Cl. 210—169)

This application is a continuation of our copending application Serial No. 449,106 filed June 30, 1942, for "Oil filters," allowed March 10, 1944, and the invention herein relates to a filter constructed of porous fibrous sheet material in a desirable economical form particularly adapted for filtering lubricating oil in internal combustion engines.

The principal object of the invention is to provide an effective filtering device utilizing fibrous sheet material.

Another object is to construct a filter using such material in such a manner that no support is necessary for the sheet material.

Another object is to provide a large filtering area in small space.

These objects and others which will be apparent are accomplished by constructions such as shown in the drawings, in which Figure 1 shows a filter casing partially broken away in section to show a filter element and means for mounting it in the casing;

Figure 2 is a similar view showing a modification;

Figure 3 is a section taken on the line 3—3 of Figure 2.

Figure 1 shows a conventional filter base 10 of a type which is widely used with internal combustion engines. A means, either cored in the engine block or provided by a conduit delivers oil to an inlet passage 11 which terminates within the outer portion of the base 10. A chamber 12, also formed in the base at the lower portion thereof, receives clean oil from the filter through a conduit 13 formed in a central clamping bolt 14. Said bolt is utilized for clamping a removable containing shell 15 in position to form a filter. Said shell is fitted with gaskets to form an oil-tight compartment capable of withstanding the oil pressure without leakage.

The description of the filter base and casing up to this point applies to both modifications as shown in Figures 1 and 2.

In the form of filtering device shown in Figure 1 the clamping bolt 14 is provided with a shoulder 16 near the lower end. A sleeve 17 frictionally fitting the bolt 14 is seated against the shoulder 16. Said shoulder is formed as an annular element threaded on the bolt 14 whereby it may be moved for removal of the sleeve 17 and the filter element carried thereby. An annular collar 17' is secured to the sleeve 17 to form a lower abutment for the filtering sections 18. Each section is formed of two nested cups of fibrous sheet material abutting each other, the sections being spaced radially from each other. At their upper ends the sections 18 are secured together by sewing, gluing, or other means, to seal off the upper end. At their lower ends each of the sections 18 embraces a spacer ring 19, the two adjacent walls being spread to engage the outer faces of the respective spacing ring. The first section is abutted against the collar 17' with the corresponding sections fitted over the sleeve 17 in contact with one another. An upper collar 20 is fitted on the upper end of the sleeve 17 and secured in position to clamp the sections in position. The spacer rings 19 are perforated to provide for the escape of oil through aligned openings 22 in the sleeve 17. The bolt 14 in this form of device has an annular recess 23 provided in the vicinity of the openings 22 to provide for the flow of oil from the filter sections. An opening 24 communicates between the recess 23 and the conduit 13 through which filtered oil is delivered. The filter sections 18, as previously mentioned, are built up of relatively thin, fibrous, sheet-like material. The two adjacent walls abut each other and are inherently, due to the nature of the material, somewhat rough on the surface. This roughened surface provides for the flow of clean oil filtered through the walls. Said filtered oil passes downwardly and escapes through the spacing elements 19. This filter is an improvement of the filter shown in the copending application Serial No. 231,954, filed September 27, 1938, now Patent No. 2,337,579, issued December 28, 1943 which discloses self-supporting walls of thin fibrous material capable of withstanding relatively high filter pressures due to the abutting walls which withstand the pressure due to their contact with each other. The roughened material used in filter elements of this type provides sufficient flowing space for the clean, filtered oil even when the elements are pressed together with filter pressures as high as 50 to 60 pounds per square inch. The filters operate successfully at any oil pressures utilized in internal combustion engines.

It will be noted in Figure 1 that the sections 18 are spaced from the shell 15 and from each other a considerable distance. This space is provided to give the filter long life as during operation the material filtered from the oil builds up to a considerable thickness on the filter surface.

In the modification shown in Figure 2, a sleeve 25 provided with a shoulder 26 is fitted into a bore 27 formed in the base 10. Said sleeve extends vertically practically the extent of the shell 15 and is provided at the upper end with a reduced portion 28 which forms a shoulder 29. A disklike clamping member 30 is seated on said shoulder. A spacer 31, which may be of resilient material, is seated on the clamping member 30. A second clamping member 32 is seated on the spacer 31. The members 30 and 32 are provided at their periphery with angularly, downturned flanges 33 and 34. Said flanges engage and clamp a flange 35 formed on a filter element wall 36 and a flange 37 formed on a filter element wall 38 against an annular perforated spacer member 39. The upper end of the reduced portion 28 of the sleeve 25 is turned over the upper spacer member 32 to clamp the filtering walls permanently in position. A sealing member 40 is fitted within the reduced end portion 28 to provide a seal between the sleeve member 25 and the bolt 14.

The two filter walls 36 and 38 are of substantially the same shape, the inner member 36 being sufficiently smaller to be slid into the member 38 during assembly. As shown in Figure 3, said filter walls are star-shaped or undulated in cross section throughout the major portion of their length, being formed circular at their upper ends to provide for the flanges 35 and 37. The lower ends of the walls are secured together by sewing or gluing in any suitable manner to seal the ends against the escape of oil. The filtered oil which has passed through the walls flows between the abutting walls upwardly and out through the spacer member 39 and the spacer 31. Openings in the spacer 31 are aligned with openings in the reduced end portion 28 of the sleeve 25 to allow the oil to escape into space between the sleeve 25 and the bolt 14. The filtered oil then passes through a cross conduit 41 into the conduit 13 in the bolt 14.

The filter walls 36 and 38 and the spaced clamping members 30 and 32 form a cup-shaped element having a flat end or bottom portion and a generally cylindrical wall portion. The element so formed is inverted with respect to the plurality of elements formed by the cup-shaped sections of Figure 1. A large filtering area is obtained in the construction shown in Figure 1 by a plurality of sections, while in the construction shown in Figures 2 and 3 the surface is undulated for the same purpose. In either form a large filtering area may be obtained in a relatively small casing.

Applicants have shown only two preferred embodiments of their improvement in filters, but it is understood that all modifications falling within the scope of the appended claims are considered a part of their invention.

What is claimed is:

1. In a filter construction having a base, a shell fitted over said base, a bolt extending through the shell and threaded into the base, means for delivering unfiltered liquid into the shell, said bolt being formed with a bore at the bottom end thereof, and means formed in the base for receiving filtered liquid from said bore; the combination therewith of a filter assembly including a sleeve member mounted within the shell in concentric contact with said bolt and having side wall opening means in communication with said bolt bore, a plurality of spaced cup-shaped filter sections each having a hole in its bottom portion surrounding said sleeve member, said filter sections including double contacting self-supporting walls having edge portions bounding the bottom holes, and clamping means about the sleeve member for securing said wall edge portions of each section in spread relation to the sleeve and in registry with said sleeve side wall opening means to provide for the escape of liquid that has filtered through said walls into the space therebetween.

2. In a liquid filtering device comprising a liquid-containing casing having a base, a shell upon said base, and a bolt extending through the shell into engagement with the base for holding the shell thereon and said bolt having a channel near its lower end for conducting filtered fluid outwardly of the device; the combination of a cup-shaped envelope including inner and outer side walls through which liquid within the casing is filterable into the envelope, said cup-shaped envelope being arranged upright in the casing with its bottom portion adjacently to said base, the envelope bottom portion containing a hole surrounding the bolt and bordered by side wall edge portions spreadable axially of the envelope, a sleeve sealed onto and about said bolt and also disposed within said envelope hole, said sleeve containing a side wall aperture in communication with the bolt channel, a spreader ring about said sleeve, said spreader ring being disposed within the envelope between the wall edge portions about said hole to spread the same and containing a radial opening communicating between the interior of the envelope and the sleeve aperture, and means for clamping said wall edge portions axially onto their respective ends of the spreader ring.

3. In a liquid filtering device comprising a liquid-containing casing having a base, a shell upon said base, and a bolt extending through the shell into engagement with the base for holding the shell thereon and said bolt having a channel near its lower end for conducting filtered fluid outwardly of the device; the combination of a cup-shaped envelope including inner and outer side walls through which liquid within the casing is filterable into the envelope, said cup-shaped envelope being inverted in the casing with its bottom portion spaced upwardly from said bolt channel, the envelope bottom portion containing a hole surrounding the bolt and bordered by side wall edge portions spreadable axially of the envelope, a sleeve disposed about said bolt to cooperate therewith in the formation of an axial channel communicating between the bolt channel and an upper interior portion of the sleeve, said upper portion of the sleeve being in registry with the bottom of the envelope and having a side-wall aperture communicating with said axial channel, a spreader ring about said sleeve upper portion, said spreader ring being disposed within the envelope between the wall edge portions about said hole to spread the same and containing a radial opening communicating between the interior of the envelope and the sleeve aperture, and means for clamping said wall edge portions axially onto their respective ends of the spreader ring.

DONALD T. EVES.
RAYMON BOWERS.

REFERENCES CITED

The following references are of record in the file of this patent:

UNITED STATES PATENTS

| Number | Name | Date |
| --- | --- | --- |
| 2,278,603 | Williams | Apr. 7, 1942 |
| 2,298,980 | Sloan et al. | Oct. 13, 1942 |
| 2,349,469 | Sloan | May 23, 1944 |